United States Patent
Pope et al.

(10) Patent No.: US 9,304,825 B2
(45) Date of Patent: Apr. 5, 2016

(54) PROCESSING, ON MULTIPLE PROCESSORS, DATA FLOWS RECEIVED THROUGH A SINGLE SOCKET

(75) Inventors: Steve Pope, Costa Mesa, CA (US); David Riddoch, Cambridge (GB)

(73) Assignee: SOLARFLARE COMMUNICATIONS, INC., Irvine, CA (US)

( * ) Notice: Subject to any disclaimer, the term of this patent is extended or adjusted under 35 U.S.C. 154(b) by 799 days.

(21) Appl. No.: 12/866,435

(22) PCT Filed: Feb. 4, 2009

(86) PCT No.: PCT/EP2009/051238
§ 371 (c)(1),
(2), (4) Date: Sep. 23, 2010

(87) PCT Pub. No.: WO2009/098216
PCT Pub. Date: Aug. 13, 2009

(65) Prior Publication Data
US 2011/0023042 A1    Jan. 27, 2011

(30) Foreign Application Priority Data
Feb. 5, 2008   (GB) .................................. 0802126.3

(51) Int. Cl.
*H04L 29/08*   (2006.01)
*G06F 9/50*    (2006.01)

(52) U.S. Cl.
CPC .............. *G06F 9/5033* (2013.01); *H04L 67/02* (2013.01); *H04L 67/14* (2013.01)

(58) Field of Classification Search
USPC .............................................. 718/1–105, 108
See application file for complete search history.

(56) References Cited

U.S. PATENT DOCUMENTS

| | | | |
|---|---|---|---|
| 5,272,599 A | 12/1993 | Koenen | |
| 5,325,532 A | 6/1994 | Crosswy et al. | |
| 5,946,189 A | 8/1999 | Koenen et al. | |
| 6,098,112 A | 8/2000 | Ishijima et al. | |
| 6,160,554 A | 12/2000 | Krause | |
| 6,304,945 B1 | 10/2001 | Koenen | |

(Continued)

FOREIGN PATENT DOCUMENTS

| | | |
|---|---|---|
| EP | 620521 A2 | 10/1994 |
| WO | 0148972 A1 | 7/2001 |

(Continued)

OTHER PUBLICATIONS

Bilic Hrvoye, et al.; article in Proceedings of the 9th Symposium on High Performance Interconnects, "Deferred Segmentation for Wire-Speed Transmission of Large TCP Frames over Standard GbE Networks," Aug. 22, 2001, 5pp.

(Continued)

*Primary Examiner* — Abdullah Al Kawsar
(74) *Attorney, Agent, or Firm* — Haynes Beffel & Wolfeld LLP; Warren S. Wolfeld (57) ABSTRACT

A data processing system supporting a network interface device and comprising: a plurality of sets of one or more data processing cores; and an operating system arranged to support at least one socket operable to accept data received from the network, the data belonging to one of a plurality of data flows; wherein the socket is configured to provide an instance of at least some of the state associated with the data flows per said set of data processing cores.

21 Claims, 1 Drawing Sheet

(56) References Cited

U.S. PATENT DOCUMENTS

| | | | |
|---|---|---|---|
| 6,349,035 B1 | 2/2002 | Koenen | |
| 6,438,130 B1 | 8/2002 | Kagan et al. | |
| 6,502,203 B2 | 12/2002 | Barron et al. | |
| 6,530,007 B2 | 3/2003 | Olarig et al. | |
| 6,667,918 B2 | 12/2003 | Leader et al. | |
| 6,718,392 B1 | 4/2004 | Krause | |
| 6,728,743 B2 | 4/2004 | Shachar | |
| 6,735,642 B2 | 5/2004 | Kagan et al. | |
| 6,768,996 B1 | 7/2004 | Steffens et al. | |
| 6,904,534 B2 | 6/2005 | Koenen | |
| 6,950,961 B2 | 9/2005 | Krause et al. | |
| 6,978,331 B1 | 12/2005 | Kagan et al. | |
| 7,093,158 B2 | 8/2006 | Barron et al. | |
| 7,099,275 B2 | 8/2006 | Sarkinen et al. | |
| 7,103,626 B1 | 9/2006 | Recio et al. | |
| 7,103,744 B2 | 9/2006 | Garcia et al. | |
| 7,136,397 B2 | 11/2006 | Sharma | |
| 7,143,412 B2 | 11/2006 | Koenen | |
| 7,149,227 B2 | 12/2006 | Stoler et al. | |
| 7,151,744 B2 | 12/2006 | Sarkinen et al. | |
| 7,216,225 B2 | 5/2007 | Haviv et al. | |
| 7,219,121 B2* | 5/2007 | Kaniyar et al. | 709/201 |
| 7,240,350 B1 | 7/2007 | Eberhard et al. | |
| 7,245,627 B2 | 7/2007 | Goldenberg et al. | |
| 7,254,237 B1 | 8/2007 | Jacobson et al. | |
| 7,285,996 B2 | 10/2007 | Fiedler | |
| 7,316,017 B1 | 1/2008 | Jacobson et al. | |
| 7,346,702 B2 | 3/2008 | Haviv | |
| 7,386,619 B1 | 6/2008 | Jacobson et al. | |
| 7,403,535 B2 | 7/2008 | Modi et al. | |
| 7,404,190 B2 | 7/2008 | Krause et al. | |
| 7,472,159 B2* | 12/2008 | Freimuth | H04L 12/5695 370/395.4 |
| 7,502,826 B2 | 3/2009 | Barron et al. | |
| 7,509,355 B2 | 3/2009 | Hanes et al. | |
| 7,518,164 B2 | 4/2009 | Smelloy et al. | |
| 7,551,614 B2 | 6/2009 | Teisberg et al. | |
| 7,554,993 B2 | 6/2009 | Modi et al. | |
| 7,573,967 B2 | 8/2009 | Fiedler | |
| 7,580,415 B2 | 8/2009 | Hudson et al. | |
| 7,580,495 B2 | 8/2009 | Fiedler | |
| 7,617,376 B2 | 11/2009 | Chadalapaka et al. | |
| 7,631,106 B2 | 12/2009 | Goldenberg et al. | |
| 7,650,386 B2 | 1/2010 | McMahan et al. | |
| 7,653,754 B2 | 1/2010 | Kagan et al. | |
| 7,688,853 B2 | 3/2010 | Santiago et al. | |
| 7,707,345 B2* | 4/2010 | Diao et al. | 710/307 |
| 7,757,232 B2 | 7/2010 | Hilland et al. | |
| 7,801,027 B2 | 9/2010 | Kagan et al. | |
| 7,802,071 B2 | 9/2010 | Oved | |
| 7,813,460 B2 | 10/2010 | Fiedler | |
| 7,827,442 B2 | 11/2010 | Sharma et al. | |
| 7,835,375 B2 | 11/2010 | Sarkinen et al. | |
| 7,848,322 B2 | 12/2010 | Oved | |
| 7,856,488 B2 | 12/2010 | Cripe et al. | |
| 7,864,787 B2 | 1/2011 | Oved | |
| 7,904,576 B2 | 3/2011 | Krause et al. | |
| 7,921,178 B2 | 4/2011 | Haviv | |
| 7,929,539 B2 | 4/2011 | Kagan et al. | |
| 7,930,437 B2 | 4/2011 | Kagan et al. | |
| 7,934,959 B2 | 5/2011 | Rephaeli et al. | |
| 7,978,606 B2 | 7/2011 | Buskirk et al. | |
| 8,000,336 B2 | 8/2011 | Harel | |
| 2002/0059052 A1 | 5/2002 | Bloch et al. | |
| 2002/0112139 A1 | 8/2002 | Krause et al. | |
| 2002/0129293 A1 | 9/2002 | Hutton et al. | |
| 2002/0140985 A1 | 10/2002 | Hudson | |
| 2002/0156784 A1 | 10/2002 | Hanes et al. | |
| 2003/0007165 A1 | 1/2003 | Hudson | |
| 2003/0058459 A1 | 3/2003 | Wu et al. | |
| 2003/0063299 A1 | 4/2003 | Cowan et al. | |
| 2003/0065856 A1 | 4/2003 | Kagan et al. | |
| 2003/0069957 A1* | 4/2003 | Malmskog et al. | 709/223 |
| 2003/0081060 A1 | 5/2003 | Zeng et al. | |
| 2003/0172330 A1 | 9/2003 | Barron et al. | |
| 2003/0191786 A1 | 10/2003 | Matson et al. | |
| 2003/0202043 A1 | 10/2003 | Zeng et al. | |
| 2003/0214677 A1 | 11/2003 | Bhaskar et al. | |
| 2004/0071250 A1 | 4/2004 | Bunton et al. | |
| 2004/0141642 A1 | 7/2004 | Zeng et al. | |
| 2004/0190533 A1 | 9/2004 | Modi et al. | |
| 2004/0190538 A1 | 9/2004 | Bunton et al. | |
| 2004/0190557 A1 | 9/2004 | Barron | |
| 2004/0193734 A1 | 9/2004 | Barron et al. | |
| 2004/0193825 A1 | 9/2004 | Garcia et al. | |
| 2004/0210754 A1 | 10/2004 | Barron et al. | |
| 2004/0252685 A1 | 12/2004 | Kagan et al. | |
| 2005/0008223 A1 | 1/2005 | Zeng et al. | |
| 2005/0018221 A1 | 1/2005 | Zeng et al. | |
| 2005/0027793 A1 | 2/2005 | Hass | |
| 2005/0038918 A1 | 2/2005 | Hilland et al. | |
| 2005/0038941 A1 | 2/2005 | Chadalapaka et al. | |
| 2005/0039171 A1 | 2/2005 | Avakian et al. | |
| 2005/0039172 A1 | 2/2005 | Rees et al. | |
| 2005/0039187 A1 | 2/2005 | Avakian et al. | |
| 2005/0066333 A1 | 3/2005 | Krause et al. | |
| 2005/0172181 A1 | 8/2005 | Huliehel | |
| 2005/0219278 A1 | 10/2005 | Hudson | |
| 2005/0219314 A1 | 10/2005 | Donovan et al. | |
| 2005/0231751 A1 | 10/2005 | Wu et al. | |
| 2005/0281249 A1* | 12/2005 | Chander et al. | 370/351 |
| 2006/0026443 A1 | 2/2006 | McMahan et al. | |
| 2006/0045098 A1 | 3/2006 | Krause | |
| 2006/0126619 A1 | 6/2006 | Teisberg et al. | |
| 2006/0165074 A1 | 7/2006 | Modi et al. | |
| 2006/0193318 A1 | 8/2006 | Narasimhan et al. | |
| 2006/0195698 A1 | 8/2006 | Pinkerton et al. | |
| 2006/0228637 A1 | 10/2006 | Jackson et al. | |
| 2006/0248191 A1 | 11/2006 | Hudson et al. | |
| 2007/0070904 A1* | 3/2007 | King et al. | 370/235 |
| 2007/0130367 A1* | 6/2007 | Kashyap | 709/245 |
| 2007/0188351 A1 | 8/2007 | Brown et al. | |
| 2007/0220183 A1 | 9/2007 | Kagan et al. | |
| 2007/0230424 A1* | 10/2007 | Wisherd | H04B 1/406 370/338 |
| 2008/0002702 A1 | 1/2008 | Bajic et al. | |
| 2008/0005352 A1* | 1/2008 | Goglin | H04L 12/56 709/238 |
| 2008/0024586 A1 | 1/2008 | Barron | |
| 2008/0109526 A1 | 5/2008 | Subramanian et al. | |
| 2008/0115216 A1 | 5/2008 | Barron et al. | |
| 2008/0115217 A1 | 5/2008 | Barron et al. | |
| 2008/0126509 A1 | 5/2008 | Subramanian et al. | |
| 2008/0135774 A1 | 6/2008 | Hugers | |
| 2008/0147828 A1 | 6/2008 | Enstone et al. | |
| 2008/0148400 A1 | 6/2008 | Barron et al. | |
| 2008/0177890 A1 | 7/2008 | Krause et al. | |
| 2008/0181245 A1* | 7/2008 | Basso et al. | 370/412 |
| 2008/0244060 A1 | 10/2008 | Cripe et al. | |
| 2008/0301406 A1 | 12/2008 | Jacobson et al. | |
| 2008/0304519 A1 | 12/2008 | Koenen et al. | |
| 2009/0089505 A1* | 4/2009 | Vasudevan | G06F 15/173 711/118 |
| 2009/0150894 A1* | 6/2009 | Huang et al. | 718/104 |
| 2009/0165003 A1* | 6/2009 | Jacobson et al. | 718/102 |
| 2009/0201926 A1 | 8/2009 | Kagan et al. | |
| 2009/0213856 A1 | 8/2009 | Paatela et al. | |
| 2009/0268612 A1 | 10/2009 | Felderman et al. | |
| 2009/0302923 A1 | 12/2009 | Smeloy et al. | |
| 2010/0023626 A1* | 1/2010 | Hussain | H04L 49/90 709/227 |
| 2010/0088437 A1 | 4/2010 | Zahavi | |
| 2010/0138840 A1 | 6/2010 | Kagan et al. | |
| 2010/0169880 A1 | 7/2010 | Haviv et al. | |
| 2010/0188140 A1 | 7/2010 | Smeloy | |
| 2010/0189206 A1 | 7/2010 | Kagan | |
| 2010/0265849 A1 | 10/2010 | Harel | |
| 2010/0274876 A1 | 10/2010 | Kagan et al. | |
| 2011/0004457 A1 | 1/2011 | Haviv et al. | |
| 2011/0010557 A1 | 1/2011 | Kagan et al. | |
| 2011/0029669 A1 | 2/2011 | Chuang et al. | |
| 2011/0029847 A1 | 2/2011 | Goldenberg et al. | |
| 2011/0044344 A1 | 2/2011 | Hudson et al. | |
| 2011/0058571 A1 | 3/2011 | Bloch et al. | |

(56) References Cited

U.S. PATENT DOCUMENTS

| | | | |
|---|---|---|---|
| 2011/0083064 | A1 | 4/2011 | Kagan et al. |
| 2011/0096668 | A1 | 4/2011 | Bloch et al. |
| 2011/0113083 | A1 | 5/2011 | Shahar |
| 2011/0116512 | A1 | 5/2011 | Crupnicoff et al. |
| 2011/0119673 | A1 | 5/2011 | Bloch et al. |
| 2011/0173352 | A1 | 7/2011 | Sela et al. |
| 2013/0227161 | A1* | 8/2013 | Vasudevan .......... H04L 47/2475 709/232 |

FOREIGN PATENT DOCUMENTS

| | | | |
|---|---|---|---|
| WO | 0235838 | A1 | 5/2002 |
| WO | 2008002945 | A1 | 1/2008 |
| WO | 2008127672 | A2 | 10/2008 |
| WO | 2009134219 | A1 | 11/2009 |
| WO | 2009136933 | A1 | 11/2009 |
| WO | 2010020907 | A2 | 2/2010 |
| WO | 2010087826 | A1 | 8/2010 |
| WO | 2011043769 | A1 | 4/2011 |
| WO | 2011053305 | A1 | 5/2011 |
| WO | 2011053330 | A1 | 5/2011 |

OTHER PUBLICATIONS

Bilic Hrvoye, et al.; presentation slides from 9th Symposium on High Performance Interconnects, "Deferred Segmentation for Wire-Speed Transmission of Large TCP Frames over Standard GbE Networks," Aug. 22, 2001, 9pp.

Geoffray P., "Protocol off-loading vs on-loading in high-performance networks," 14th Symposium on High Performance Interconnects, Aug. 23, 2006, 5pp.

Dickman, L., "Protocol OffLoading vs OnLoading in High Performance Networks," 14th Symposium on High Performance Interconnects, Aug. 23, 2006, 8pp.

Mogul J., "TCP offload is a dumb idea whose time has come," USENIX Assoc., Proceedings of HotOS IX: The 9th Workshop on Hot Topics in Operating Systems, May 2003, pp. 24-30.

Petrini F., "Protocol Off-loading vs On-loading in High-Performance Networks," 14th Symposium on High Performance Interconnects, Aug. 23, 2006, 4pp.

Regnier G., "Protocol Onload vs. Offload," 14th Symposium on High Performance Interconnects, Aug. 23, 2006, 1pp.

Montry G., OpenFabrics Alliance presentation slides, 14th Symposium on High Performance Interconnects, Aug. 23, 2006, 8pp.

Joe Touch, et al.; "Atomic-2" slides, Gigabit Networking Workshop '97 Meeting, Kobe, Japan, Apr. 1997, 10pp.

Joe Touch, et al.; "Host-based Routing Using Peer DMA," Gigabit Networking Workshop '97 Meeting, Kobe, Japan, Apr. 1997, 2pp.

A. Edwards, et al.; "User-Space Protocols Deliver High Performance to Applications on a Low-Cost Gb/s LAN," ACM Computer Communication Review, vol. 24, No. 4, pp. 14-23, Oct. 1994.

A. Edwards, S. Muir; "Experiences Implementing a High-Performance TCP in User-Space," ACM Computer Communication Review, vol. 25, No. 4, Oct. 1995, 10 pages.

A. Romanow and S. Floyd; "The Dynamics of TCP Traffic over ATM Networks," ACM Computer Communication Review, vol. 24, No. 4, p. 79-88, Oct. 1994.

Andrew D. Birrell, et al.; "Grapevine: An Exercise in Distributed Computing," Communications of the ACM, vol. 25, Issue 4, pp. 260-274, Apr. 1982.

Andy Currid; "TCP Offload to the Rescue," ACM Queue, vol. 2, No. 3, May 1, 2004, 8 pages.

B. Leslie, et al.; "User-level device drivers: Achieved performance," J. Comput. Sci. & Technol., vol. 20, Sep. 2005, 17 pages.

Babak Falsafi, et al.; "Application-Specific Protocols for User-Level Shared Memory," Proceedings of the 1994 conference on Supercomputing, pp. 380-389, Washington D.C.; Nov. 14, 1994.

Boon S. Ang, et al.; "StarT-Voyager: A Flexible Platform for Exploring Scalable SMP Issues," Proceedings of the 1998 ACM/IEEE conference on Supercomputing, Orlando, Florida; Nov. 7, 1998, 20 pages.

Bruce Lowekamp, et al.; "Topology Discovery for Large Ethernet Networks," ACM Computer Communication Review, vol. 31, No. 4, Oct. 2001, 12 pages.

Bruce S. Davie; "A Host-Network Interface Architecture for ATM," ACM Computer Communication Review, vol. 21, No. 4, Sep. 1991, 9 pages.

C. A. Thekkath, et al.; "Implementing Network Protocols at User Level," ACM Computer Communication Review, vol. 23, No. 4, Oct. 1993, 10 pages.

C. Brendan S. Traw, et al.; "A High-Performance Host Interface for ATM Networks," ACM Computer Communication Review, vol. 21, No. 4, p. 317-325, Sep. 1991.

C. Kline; "Supercomputers on the Internet: A Case Study," ACM Computer Communication Review, vol. 17, No. 5, Aug. 1987, 7 pages.

C. Partridge, J. Hughes, J. Stone; "Performance of Checksums and CRCS over Real Data," ACM Computer Communication Review, vol. 25, No. 4, p. 68-76, Oct. 1995.

C. Traw and J. Smith; "Hardware/Software organization of a high performance ATM host interface," IEEE Journal on Selected Areas in Communications, pp. 240-253, Feb. 1993.

Charles Kalmanek; "A Retrospective View of ATM," ACM Computer Communication Review, vol. 32, No. 5, pp. 13-19, Nov. 2002.

Charles P. Thacker and Lawrence C. Stewart; "Firefly: a Multiprocessor Workstation," ACM Operating Systems Review, vol. 21, Issue 4, p. 164-172, Oct. 1997.

Cheng Jin, et al.; "FAST TCP: Motivation, Architecture, Algorithms, Performance," Proceedings of IEEE Infocom 2004, pp. 1246-1259; Mar. 7, 2004.

Chi-Chao Chang, et al.; "Low-Latency Communication on the IBM RISC System/6000 SP," Proceedings of the 1996 ACM/IEEE conference on Supercomputing, Pittsburgh; Nov. 17, 1996.

Chris Maeda, Brian Bershad; "Protocol Service Decomposition for High-Performance Networking," ACM Operating Systems Review, vol. 27, Issue 5, p. 244-255, Dec. 1993.

Christopher A. Kent, Jeffrey C. Mogul; "Fragmentation Considered Harmful," ACM Computer Communication Review, vol. 17, No. 5, pp. 390-401, Oct. 1987.

Craig Partridge; "How Slow Is One Gigabit Per Second ?," ACM Computer Communication Review, vol. 20, No. 1, p. 44-53, Jan. 1990.

D. D. Clark and D. L. Tennenhouse; "Architectural Considerations for a New Generation of Protocols," ACM Computer Communication Review, vol. 20, No. 4, pp. 200-208, Sep. 1990.

D. L. Tennenhouse, D. J. Wetherall; "Towards an Active Network Architecture," ACM Computer Communication Review, vol. 26, No. 2, pp. 15-20, Apr. 1996.

Danny Cohen, et al.; "Use of message-based multicomputer components to construct gigabit networks," ACM Computer Communication Review, vol. 23, No. 4, p. 32-44, Jul. 1993.

Danny Cohen, Gregory Finn, Robert Felderman, Annette DeSchon; "ATOMIC: A Local Communication Network Created Through Repeated Application of Multicomputing Components," Provided by Authors; Jan. 10, 1992, 12 pages.

Danny Cohen, Gregory Finn, Robert Felderman, Annette DeSchon; "ATOMIC: A High-Speed Local Communication Architecture," Journal of High Speed Networks; Jan. 3, 1994, 21pages.

David A. Borman; "Implementing TCP/IP on a Cray computer," ACM Computer Communication Review, vol. 19, No. 2, p. 11-15, Apr. 1989.

David D. Clark; "The Design Philosophy of the DARPA Internet Protocols," ACM Computer Communication Review, vol. 18, No. 4, pp. 106-114, Aug. 1988.

David D. Clark, et al.; "An Analysis of TCP Processing Overhead," IEEE Communications Magazine, vol. 27, No. 6, pp. 23-29, Jun. 1989.

David R. Boggs, et al.; "Measured Capacity of an Ethernet: Myths and Reality," ACM Computer Communication Review, vol. 18, No. 4, p. 222-234, Aug. 1988.

David R. Cheriton; "Sirpent: A High-Performance Internetworking Approach," ACM Computer Communication Review, vol. 19, No. 4, p. 158-169, Sep. 1989.

(56) References Cited

OTHER PUBLICATIONS

David Wetherall; "10 Networking Papers: Readings for Protocol Design," ACM Computer Communication Review, vol. 36, No. 3, pp. 77-78, Jul. 2006.
Derek McAuley, Rolf Neugebauer; "A case for Virtual Channel Processors," Proceedings of the ACM SIGCOMM 2003 Workshops; Aug. 2003, 6 pages.
Derek Robert McAuley; "Protocol Design for High Speed Networks," PhD Thesis, University of Cambridge, Sep. 1989, 104 pages.
E. Blanton and M. Allman; "On Making TCP More Robust to Packet Reordering," ACM Computer Communication Review, vol. 32, No. 1, Jan. 2002, 11 pages.
E. Ruetsche; "The Architecture of Gb/s Multimedia Protocol Adapter," ACM Computer Communication Review, vol. 23, No. 3, Jul. 1993, 10 pages.
Ed Anderson, et al.; "Performance of the CRAY T3E Multiprocessor," Proceedings of the 1997 ACM/IEEE conference on Supercomputing, p. 1-17, San Jose, California; Nov. 16, 1997.
Edward D. Lazowska, David A. Patterson; "Computing Research: A Looming Crisis," ACM Computer Communication Review, vol. 35, No. 2, Jul. 2005, 4 pages.
Eric C. Cooper, et al.; "Protocol Implementation on the Nectar Communication Processor," ACM Computer Communication Review, vol. 20, No. 4, p. 135-144, Sep. 1990.
Erich Ruetsche and Matthias Kaiserswerth; "TCP/IP on the Parallel Protocol Engine," Proceedings of the IFIP TC6/WG6.4 Fourth International Conference on High Performance Networking IV; Dec. 14, 1992, 16 pages.
F.F. Kuo; "The Aloha System," ACM Computer Communication Review, vol. 4 No. 1, Jan. 1974, 4 pages.
Gary S. Delp, et al.; "An Analysis of Memnet: An Experiment in High-Speed Shared-Memory Local Networking," ACM Computer Communication Review, vol. 18, No. 4, p. 165-174, Aug. 1988.
Gene Tsudik; "Message Authentication with One-Way Hash Functions," ACM Computer Communication Review, vol. 22, No. 5, pp. 29-38, Oct. 1992.
Gordon E. Moore; "Cramming more components onto integrated circuits," Electronics, vol. 38, No. 8, pp. 114-117, Apr. 1, 1965.
Greg Chesson; "The Evolution of XTP," Proceedings of the Third International Conference on High Speed Networking, Nov. 1991, 10pages.
Greg Minshall, et al.; "Flow labelled IP over ATM: design and rationale ," ACM Computer Communication Review, vol. 36, No. 3, pp. 79-92, Jul. 2006.
Greg Regnier, et al.; ETA: Experience with an Intel Xeon Processor as a Packet Processing EngineIEEE Micro, vol. 24, No. 1, p. 24-31, Jan. 1994.
Greg Regnier, et al.; "TCP Onloading for Data Center Servers," Computer, IEEE Computer Society, vol. 37, No. 11, pp. 48-58, Nov. 2004.
Gregory G. Finn; "An Integration of Network Communication with Workstation Architecture," ACM Computer Communication Review, vol. 21, No. 5, p. 18-29, Oct. 1991.
Gregory G. Finn and Paul Mockapetris; "Netstation Architecture Multi-Gigabit Workstation Network Fabric," Proceedings of InterOp '94, Las Vegas, Nevada; May 1994, 9 pages.
Gregory L. Chesson; "Declaration of Dr Gregory L Chesson in Alacritech v. Microsoft," United States District Court, Northern District California, San Francisco Division; Feb. 4, 2005.
H. K. Jerry Chu; "Zero-Copy TCP in Solaris," Proceedings of the USENIX Annual Technical Conference; Jan. 1996, 13 pages.
H. Kanakia and D. Cheriton; "The VMP Network Adapter Board (NAB): High-Performance Network Communication for Multiprocessors," ACM Computer Communication Review, vol. 18, No. 4, p. 175-187, Aug. 1988.
Harvey J. Wassermann, et al.; "Performance Evaluation of the SGI Origin2000: A Memory-Centric Characterization of LANL ASCI Applications," Proceedings of the 1997 ACM/IEEE conference on Supercomputing, p. 1-11, San Jose, California; Nov. 16, 1997.
Humaira Kamal, et al.; "SCTP versus TCP for MPI," Proceedings of the 2005 ACM/IEEE conference on Supercomputing, Seattle, p. 30, Washington; Nov. 12, 2005.
Ian Leslie and Derek R. McAuley; "Fairisle: An ATM Network for the Local Area," ACM Computer Communication Review, vol. 21, No. 4, p. 327, Sep. 1991.
Ian M. Leslie, et al.; "The Architecture of the Universe Network," ACM Computer Communication Review, vol. 14, No. 2, pp. 2-9, Jun. 1984.
Ian Pratt and Keir Fraser; "Arsenic: A User-Accessible Gigabit Ethernet Interface," Proceedings of IEEE Infocom 2001, pp. 67-76; Apr. 22, 2001.
J. C. Mogul; "The Case for Persistent-Connection HTTP," ACM Computer Communication Review, vol. 25, No. 4, Oct. 1995, 15 pages.
J. Carver Hill; "Synchronizing Processors with Memory-Content-Generated Interrupts," Communications of the ACM, vol. 16, No. 6, p. 350-351, Jun. 1973.
J. Evans and T. Buller; "The End of History," IEEE TCGN Gigabit Networking Workshop, Apr. 22, 2001, 10pages.
J. Vis; "A Simple LAN Performance Measure," ACM Computer Communication Review, vol. 24, No. 1, pp. 7-11, Jan. 1994.
Jack B. Dennis and Earl C. Van Horn; "Programming Semantics for Multiprogrammed Computations," Communications of the ACM, vol. 9, No. 3, pp. 143-155, Mar. 1966.
Jeffrey C. Mogul; "TCP offload is a dumb idea whose time has come," Proceedings of HotOS IX: The 9th Workshop on Hot Topics in Operating Systems, pp. 25-30; May 18, 2003.
Jeffrey R. Michel; "The Design and Evaluation of an Off-Host Communications Protocol Architecture," MSci Thesis, University of Virginia, Aug. 1993, 139 pages.
Jenwei Hsieh, et al.; "Architectural and Performance Evaluation of GigaNet and Myrinet Interconnects on Clusters of Small-Scale SMP Servers," Proceedings of the 2000 ACM/IEEE conference on Supercomputing, Dallas, Texas; Nov. 4, 2000, 9 pages.
Jiuxing Liu, et al.; "Performance Comparison of MPI Implementations over InfiniBand, Myrinet and Quadrics," Proceedings of the 2003 ACM/IEEE conference on Supercomputing, Phoenix, Arizona; Nov. 15, 2003, 14 pages.
John M. McQuillan, et al.; "An Overview of the New Routing Algorithm for the ARPANET," Proceedings of the 6th Data Communications Symposium, p. 63, Nov. 1979.
John Nagle; "Congestion Control in IP/TCP Internetworks," ACM Computer Communication Review, vol. 14, No. 4, p. 11-17, Oct. 1984.
John Salmon, et al.; "Scaling of Beowulf-class Distributed Systems," Proceedings of the 1998 ACM/IEEE conference on Supercomputing, Orlando, Florida; Nov. 7, 1998, 18 pages.
Jon Crowcroft; "10 Networking Papers: Recommended Reading," ACM Computer Communication Review, vol. 36, No. 2, pp. 51-52, Apr. 2006.
Jon Crowcroft, Derek McAuley; "ATM: A Retrospective on Systems Legacy," ACM Computer Communication Review, vol. 32, No. 5, Nov. 2002, 2 pages.
Jonathan Kay and Joseph Pasquale; "The Importance of Non-Data Touching Processing Overheads in TCP/IP," ACM Computer Communication Review, vol. 23, No. 4, pp. 259-268, Oct. 1993.
Jonathan M. Smith and C. Brendan S. Traw; "Giving Applications Access to Gb/s Networking," IEEE Network, vol. 7, Issue 4, pp. 44-52, Jul. 1993.
Jonathan Smith; "The Influence of ATM on Operating Systems," ACM Computer Communication Review, vol. 32, No. 5, pp. 29-37, Nov. 2002.
Jonathan Stone, Craig Partridge; "When the CRC and TCP Checksum Disagree," ACM Computer Communication Review, vol. 30, No. 4, pp. 309-319, Oct. 2000.
Jose Carlos Sancho, et al.; "Quantifying the Potential Benefit of Overlapping Communication and Computation in Large-Scale Scientific Applications," Proceedings of the 2006 ACM/IEEE conference on Supercomputing, Tampa, Florida; Nov. 11, 2006, 16 pages.
Justin Hurwitz, Wu-chun Feng; "Initial End-to-End Performance Evaluation of 10-Gigabit Ethernet," Proceedings of the 11th Symposium on High Performance Interconnects; Aug. 20, 2003, 6 pages.

(56) References Cited

OTHER PUBLICATIONS

K. Kleinpaste, P. Steenkiste, B. Zill; "Software Support for Outboard Buffering and Checksumming," ACM Computer Communication Review, vol. 25, No. 4, p. 87-98, Oct. 1995.
Ken Calvert; "Reflections on Network Architecture: an Active Networking Perspective," ACM Computer Communication Review, vol. 36, No. 2, pp. 27-30, Apr. 2006.
Kieran Mansley, et al.; "Getting 10 Gb/s from Xen," Euro-Par Conference 2007, pp. 224-233, Rennes, France; Aug. 28, 2007.
L. S. Brakmo, et al.; "TCP Vegas: New Techniques for Congestion Detection and Avoidance," ACM Computer Communication Review, vol. 24, No. 4, p. 24-35, Oct. 1994.
M. Allman; "TCP Byte Counting Refinements," ACM Computer Communication Review, vol. 29, No. 3, Jul. 1999, 9 pages.
M. de Vivo, et al.; "Internet Vulnerabilities Related to TCP/IP and T/TCP," ACM Computer Communication Review, vol. 29, No. 1, pp. 81-85, Jan. 1999.
M. Kaiserswerth; "The Parallel Protocol Engine," IEEE/ACM Transactions in Networking vol. 1, Issue 6, pp. 650-663, Dec. 1993.
M.V. Wilkes and R.M. Needham; "The Cambridge Model Distributed System," ACM SIGOPS Operating Systems Review, vol. 14, Issue 1, pp. 21-29, Jan. 1980.
Margaret L. Simmons and Harvey J. Wasserman; "Performance Comparison of the Cray-2 and Cray X-MP/416 Supercomputers," Proceedings of the 1988 ACM/IEEE conference on Supercomputing, p. 288-295, Orlando, Florida; Nov. 12, 1988.
Mark David Hayter; "A Workstation Architecture to Support Multimedia," PhD Thesis, University of Cambridge, Sep. 1993, 111 pages.
Mark Hayter, Derek McAuley; "The Desk Area Network," ACM Operating Systems Review, vol. 25, Issue 4, p. 14-21, Oct. 1991.
Marvin Zelkowitz; "Interrupt Driven Programming," Communications of the ACM, vol. 14, No. 6, p. 417-418, Jun. 1971.
Matthias Kaiserswerth; "The Parallel Protocol Engine," IEEE/ACM Transactions in Networking vol. 1, Issue 6, pp. 650-663, Dec. 1993.
Mengjou Lin, et al.; "Performance of High-Speed Network I/O Subsystems: Case Study of a Fibre Channel Network," Proceedings of the 1994 conference on Supercomputing, Washington D.C.; Nov. 14, 1994, 10 pages.
Michael J. Dixon; "System support for multi-service traffic," University of Cambridge Computer Laboratory Technical Report No. 245; Jan. 1992, 113 pages.
Michael S. Warren, et al.; "Avalon: An Alpha/Linux Cluster Achieves 10 Gflops for $150k," Proceedings of the 1998 ACM/IEEE conference on Supercomputing, Orlando, Florida; Nov. 7, 1998, 10 pages.
Murali Rangarajan, et al.; "TCP Servers: Offloading TCP Processing in Internet Servers. Design, Implementation, and Performance," Technical Report DCR-TR-481, Computer Science Department, Rutgers University, Mar. 2002, 14 pages.
Nanette J. Boden, et al.; "Myrinet: A Gigabit-per-Second Local-Area Network," Draft of paper published in IEEE Micro, vol. 15, No. 1, pp. 29-36, 1995; Nov. 16, 1994.
NR Adiga, et al.; "An Overview of the BlueGene/L Supercomputer," Proceedings of the 2002 ACM/IEEE conference on Supercomputing, pp. 1-22, Baltimore; Nov. 16, 2002.
O. Angin, et al.; "Report on the 5th IFIP Internation Workshop on Quality of Service (IWQOS 97)," ACM Computer Communication Review, vol. 27, No. 3, pp. 100-117, Jul. 1997.
P. Balaji, et al.; "Head-to-TOE Evaluation of High-Performance Sockets Over Protocol Offload Engines," Proceedings of the IEEE International Conference on Cluster Computing, Sep. 2005, 10 pages.
P. Druschel, et al.; "Experiences with a High-Speed Network Adaptor: A Software Perspective," ACM Computer Communication Review, vol. 24, No. 4, Oct. 1994, 12 pages.
P. Kermani and L. Kleinrock; "Virtual cut-through: A new computer communciation switching technique," Computer Networks, vol. 3, No. 4, pp. 267-286, Sep. 1979.

Parry Husbands and James C. Hoe; "MPI-StarT: Delivering Network Performance to Numerical Applications," Proceedings of the 1998 ACM/IEEE conference on Supercomputing, p. 1-15, Orlando, Florida; Nov. 7, 1998.
Pasi Sarolahti, et al.; "F-RTO: An Enhanced Recovery Algorithm for TCP Retransmission Timeouts," ACM Computer Communication Review, vol. 33, No. 2, Apr. 2003, 13 pages.
Patrick Crowley, et al.; "Characterizing Processor Architectures for Programmable Network Interfaces," Proceedings of the 14th international conference on Supercomputing, pp. 54-65, Santa Fe, New Mexico; May 8, 2000.
Patrick Geoffray; "A Critique of RDMA," HPCWire article: hpcwire.com/features/17886984.html; Aug. 18, 2006, 7 pages.
Paul E. McKenney and Ken F. Dove; "Efficient Demultiplexing of Incoming TCP Packets," ACM Computer Communication Review, vol. 22, No. 4, Oct. 1992, 11 pages.
Paul Ronald Barham; "Devices in a Multi-Service Operating System," PhD Thesis, University of Cambridge, Jul. 1996, 142 pages.
Paul V. Mockapetris, Kevin J. Dunlap; "Development of the Domain Name System," ACM Computer Communication Review, vol. 18, No. 4, pp. 123-133, Aug. 1988.
Peter Druschel and Larry L. Peterson; "Fbufs: A High-Bandwidth Cross-Domain Transfer Facility," ACM Operating Systems Review, vol. 27, Issue 5, p. 189-202, Dec. 1993.
Peter Steenkiste; "Analyzing Communication Latency using the Nectar Communication Processor," ACM Computer Communication Review, vol. 22, No. 4, Oct. 1992, 11 pages.
Philip Buonadonna, et al.; "An Implementation and Analysis of the Virtual Interface Architecture," Proceedings of the 1998 ACM/IEEE conference on Supercomputing, p. 1-15, Orlando, Florida; Nov. 7, 1998.
Piyush Shivam, et al.; "EMP: Zero-copy OS-bypass NIC-driven Gigabit Ethernet Message Passing," Proceedings of the 2001 ACM/IEEE conference on Supercomputing, pp. 57, Denver; Nov. 10, 2001.
R. Braden, et al.; "Computing the Internet Checksum," ACM Computer Communication Review, vol. 19, No. 2, p. 86-94, Apr. 1989.
R. Bush, D. Meyer; "Some Internet Architectural Guidelines and Philosophy," IETF Network Working Group, Request for Comments: 3439; Dec. 2002, 25 pages.
R. J. Black, I. Leslie, and D. McAuley; "Experiences of Building an ATM Switch for the Local Area," ACM Computer Communication Review, vol. 24, No. 4, p. 158-167, Oct. 1994.
Raj K. Singh, et al.; "A Programmable HIPPI Interface for a Graphics Supercomputer," Proceedings of the 1993 ACM/IEEE conference on Supercomputing, pp. 452-461, Portland, Oregon; Nov. 15, 1993.
Raj K. Singh, et al.; "A Programmable Network Interface for a Message-Based Multicomputer," ACM Computer Communication Review, vol. 24, No. 3, p. 8-17, Jul. 1994.
Robert M. Brandriff, et al.; "Development of a TCP/IP for the IBM/370," ACM Computer Communication Review, vol. 15, No. 4, Sep. 1985, 7 pages.
Robert M. Metcalfe and David R. Boggs; "Ethernet: distributed packet switching for local computer networks," Communications of the ACM, vol. 19, Issue 7, pp. 395-404, Jul. 1976.
Robert Ross, et al.; "A Case Study in Application I/O on Linux Clusters," Proceedings of the 2001 ACM/IEEE conference on Supercomputing, pp. 11, Denver; Nov. 10, 2001.
S. L. Pope, et al.; "Enhancing Distributed Systems with Low-Latency Networking," Parallel and Distributed Computing and Networks, Brisbane, Australia, Dec. 1998, 12 pages.
Sally Floyd; "TCP and Explicit Congestion Notification," ACM Computer Communication Review, vol. 24, No. 5, p. 8-23, Oct. 1994.
Sayantan Sur, et al.; "High-Performance and Scalable MPI over InfiniBand with Reduced Memory Usage: An In-Depth Performance Analysis," Proceedings of the 2006 ACM/IEEE conference on Supercomputing, Tampa, Florida; Nov. 11, 2006, 13 pages.
Srihari Makineni and Ravi Iyer; "Architectural Characterization of TCP/IP Packet Processing on the Pentium M Processor," Proceedings of the 10th International Symposium on High Performance Computer Architecture, pp. 152; Feb. 14, 2004.
Steve Muir and Jonathan Smith; "Piglet: A Low-Intrusion Vertical Operating System," Technical Report MS-CIS-00-04, University of Pennsylvania, Jan. 2000, 15 pages.

(56) References Cited

OTHER PUBLICATIONS

Steven J. Sistare, Christopher J. Jackson; "Ultra-High Performance Communication with MPI and the Sun Fire Link Interconnect," Proceedings of the 2002 ACM/IEEE conference on Supercomputing, p. 1-15, Baltimore; Nov. 16, 2002.
Steven Pope, David Riddoch; "10Gb/s Ethernet Performance and Retrospective," ACM Computer Communication Review, vol. 37, No. 2, pp. 89-92, Mar. 19, 2007.
Stuart Wray, et al.; "The Medusa Applications Environment," Proceedings of the International Conference on Multimedia Computing and Systems, p. 265-273, Boston, May 1994.
Sumitha Bhandarkar, et al.; "LTCP: Improving the Performance of TCP in Highspeed Networks," ACM Computer Communication Review, vol. 36, No. 1, pp. 41-50, Jan. 2006.
Thomas Sterling, et al.; "Beowolf: A Parallel Workstation for Scientific Computation," Proceedings of the 24th International Conference on Parallel Processing, pp. 11-14; Aug. 1995.
Thorsten von Eicken, et al.; "U-Net: A User-Level Network Interface for Parallel and Distributed Computing," ACM Operating Systems Review, vol. 29, Issue 5, p. 109-126, Dec. 1995.
Tom Kelly; "Scalable TCP: Improving Performance in Highspeed Wide Area Networks," ACM Computer Communication Review, vol. 33, No. 2, pp. 83-91, Apr. 2003.
V. Cerf, et al.; "Proposal for an International End-to-End Protocol," ACM Computer Communication Review, vol. 6 No. 1, p. 1-18, Jan. 1976.
V. Jacobson; "Congestion Avoidance and Control," ACM Computer Communication Review, vol. 18, No. 4, p. 314-329, Aug. 1988.
Various forum members; "MPI: A Message-Passing Interface Standard," Message-Passing Interface Forum, University of Tennessee, Knoxville, May 5, 1994, 236 pages.
Vinay Aggarwal, et al.; "Workshop on network-I/O convergence: experience, lessons, implications (NICELI)," ACM Computer Communication Review, vol. 33, No. 5, Oct. 2003, 6 pages.
W. E. Leland, et al.; "On the Self-Similar Nature of Ethernet Traffic," ACM Computer Communication Review, vol. 23, No. 4, p. 85-95, Oct. 1993.
W. Feng and P. Tinnakornsrisuphap; "The Failure of TCP in High-Performance Computational Grids," Proceedings of the 2000 ACM/IEEE conference on Supercomputing, Dallas, Texas; Nov. 4, 2000, 11 pages.
W. Feng, et al.; "Performance Characterization of a 10-Gigabit Ethernet TOE," Proceedings of the 13th Symposium on High Performance Interconnects; Aug. 17, 2005, 6 pages.
Wu-chun Feng, et al.; "Optimizing 10-Gigabit Ethernet for Networks of Workstations, Clusters, and Grids: A Case Study," Proceedings of the 2003 ACM/IEEE conference on Supercomputing, Phoenix, Arizona; Nov. 15, 2003.
EP—13163981.7—Extended European Search Report dated Jul. 28, 2014, 22 pages.
Anonymous: "Scalable Networking: Eliminating the Receive Processing Bottleneck?Introducing RSS," Microsoft Corporation, Apr. 14, 2004, 17 pages.
Anonymous: "Microsoft Windows Scalable Networking Initiative," Microsoft Corporation, Apr. 13, 2004, 11 pages.
Anonymous: "Receive-Side Scaling Enhancements in Windows Server 2888," Microsoft Corporation, Nov. 5, 2008, 18 pages.
Willmann P et al: "An Evaluation of Network Stack Parallelization Strategies in Modern Operating Systems," Poceedings of the 2006 Usenix Annual Technical Conference Usenix Association, Jun. 3, 2006, pp. 91-96, Berkeley, CA, USA.

\* cited by examiner

PROCESSING, ON MULTIPLE PROCESSORS, DATA FLOWS RECEIVED THROUGH A SINGLE SOCKET

BACKGROUND OF THE INVENTION

This invention relates to the handling of connections over a network at a data processing system having a plurality of processor cores.

In conventional networked personal computers and servers having more than one CPU core, the processing of received data packets is usually performed on just one of the CPU cores. When incoming packets are received at the network controller of the computer or server (generically, a data processor), they are delivered into host memory via a receive channel. A receive channel has an associated notification mechanism, which serves to inform the host software of the arrival of packets. Typically the notification mechanism includes an interrupt, which is raised when received packets are available for processing. In response to the interrupt an interrupt service routine is invoked on one of the CPU cores, and causes that CPU core to perform the work associated with processing the incoming packets. This work can be significant, and at high data rates this CPU core typically becomes a bottleneck in the system.

The above problem is especially severe with high data rate network architectures such as 10 and 100 Gb Ethernet. Current single processor designs struggle to cope at peak high throughput of data and any sources of inefficiency in the handling of incoming data packets must be minimised if the promise of such high data transfer speeds is to be realised.

Figure 1:
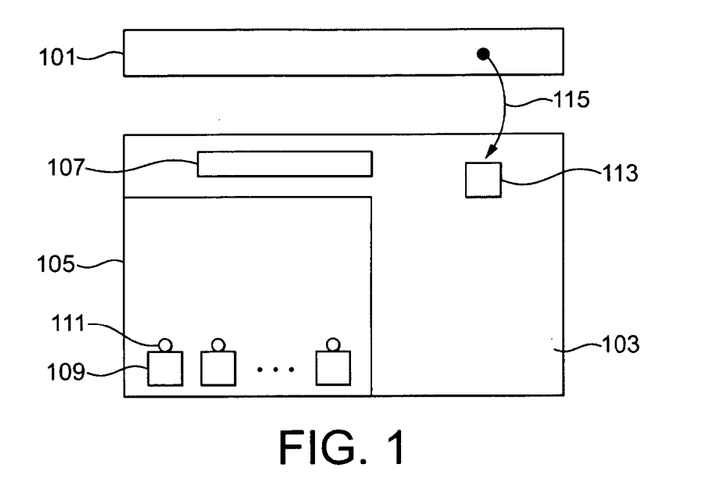
FIG. 1 shows the conventional structure of a data processing system having a monolithic operating system architecture.

FIG. 1 shows a typical structure of a data processing system having a monolithic operating system architecture. Kernel 103 manages hardware such as a network interface controller (NIC) 101 by means of driver 107 and controls the resources of the system. The kernel receives hardware interrupts 115 at interrupt handler 113 and, in response to being notified that there is available incoming packet data, performs receive processing of the data. The processed traffic data is delivered to the appropriate socket 111 and application 109, which executes in user space 105.

With the aim of mitigating some of the problems described above, Microsoft has developed the Receive Side Scaling (RSS) architecture which improves performance by spreading the processing load across multiple CPU cores. Each received packet is delivered to the host via one of a number of receive channels, each associated with a notification mechanism. Each receive channel and notification mechanism pair is associated, typically via an interrupt, with a different CPU core, so that the packets delivered to different receive channels are processed on different CPU cores. It is arranged that all packets of a given data flow are delivered to a single receive channel, and so are processed at the same CPU. This is necessary to ensure that packets of a given data flow are processed in the order that they arrive.

Conventional operating systems typically maintain state associated with each data flow, and RSS ensures that when processing received data, the state for a given flow is always accessed by the same CPU core. However, the state associated with data flows may also be accessed in response to requests from applications or other software entities, which could potentially execute on any CPU cores in the system. Thus, in certain situations, any given state might be accessed by means of a different CPU core to the one handling received data of the data flow to which the state relates. This causes the state to be moved between the caches of the respective CPU cores, resulting in inefficient handling of the request.

Conventional methods for distributing packet processing over multiple processors, such as RSS, suffer from two main problems:

(i) Locks

State information relating to a particular data flow may be accessed by code executing on multiple processors and must therefore be protected from concurrent access. Typically this is achieved through the use of state locks. When locks are not contended they incur a relatively small (but still significant) overhead. However, when locks are contended, the loss in efficiency is very high. This can occur when a receive path executes on more than one processor core and each core is required to access the same state information of that receive path. In particular, while a kernel thread running on a processor is blocked waiting for a lock, that processor will probably not be able to perform any useful work. Processors in conventional multi-processor networked systems can spend a significant time waiting for locks.

(ii) Cache Effects

As the network stack executes on a processor, any state in host memory that it touches (reads or writes) will be copied into the cache(s) close to that processor core. When state is written, it is purged from the caches of any other processor cores. Thus, in the case when a network stack executes concurrently on multiple cores, if more than one processor writes to shared cache lines in the state of the stack the cache lines will bounce between the cores. This is highly inefficient since each cache write operation to the network stack state by a particular processor causes the other processors handling that stack to purge, and later reload, those cache lines.

Where locks are used to protect shared state, the memory that implements those locks is itself shared state, and is also subject to cache-line bouncing.

Lock-free techniques for managing concurrent access to shared state may not suffer from the blocking behaviour of locks, but do suffer from cache-bouncing.

There is therefore a need for an improved method of distributing the processing load associated with handling network packets in data processing systems having multiple CPU cores.

SUMMARY OF THE INVENTION

According to a first aspect of the present invention there is provided a data processing system supporting a network interface device and comprising: a plurality of sets of one or more data processing cores; and an operating system arranged to support at least one socket operable to accept data received from the network, the data belonging to one of a plurality of data flows; wherein the socket is configured to provide an instance of at least some of the state associated with the data flows per said set of data processing cores.

The socket may be a listening socket. Suitably, each instance of the at least some of the state associated with the data flows of the listening socket includes an accept queue. Suitably, each instance of the at least some of the state associated with the data flows of the listening socket includes a syn-recv queue.

The socket may be one or both of an unconnected socket and a datagram socket. Suitably, each instance of the at least some of the state associated with the data flows of the socket includes a receive queue of the socket. Suitably, each instance of at least some of the state associated with the data flows of the socket includes transmit state of the socket.

Preferably, on receiving one or more data packets of a data flow, the system is configured to select a particular data processing core of the data processing system to perform packet processing of the received data packets, the selected data processing core belonging to one of the sets of one or more data processing cores. The selection could be performed in accordance with a receive side scaling algorithm. The processing core could be selected in dependence on one or more characteristics of the received data packets. At least one of the characteristics could be a field of the data packet header, such as a destination address or port number.

Preferably the instance of at least some of the state provided for a particular set of processing cores includes that state relating to data flows selected to be processed at the processing cores of that set. Preferably said instance of at least some of the state does not include state relating to data flows selected to be processed at processing cores which are not part of the set.

The data processing system may further comprise an application thread scheduled to execute at a particular processing core of the data processing system.

Suitably, when the application thread invokes an operation on the socket, the data processing system is configured to use in the operation the instance of the at least some of the state provided for the set of processing cores that includes the processing core at which the application thread is scheduled to execute. Suitably, the operation is to accept a new connection and the instance of at least some of the state used includes an accept queue. Suitably, the operation is to receive data and the instance of at least some of the state used includes a receive queue.

Suitably, when the application thread invokes an operation on the socket relating to a particular data flow, the data processing system is configured to use in the operation the instance of at least some of the state provided for the set of processing cores which includes the data processing core selected to perform processing of data belonging to that data flow.

The operation invoked on the socket could be an operation arranged to cause: a new connection to be accepted, data to be received, or data to be transmitted. The operation invoked on the socket could be an operation arranged to query a status of the socket.

Suitably, when the application thread invokes an operation on the socket, the data processing system is configured to use in the operation any instances of the state within the socket.

The data processing system may further comprise a plurality of packet processing entities, each arranged to execute at a particular one of the processing cores allocated for performing packet processing and each maintaining at least some of the state of the socket.

The set of processing cores could comprise processing cores that share a cache. The set of processing cores could comprise processing cores that share the same die. The set of processing cores could comprise processing cores that are members of the same non-uniform memory architecture node.

Preferably, the operating system is arranged to support a plurality of sockets and each socket is configured to provide an instance of at least some of the state associated with the data flows of the respective socket per said set of processing cores.

According to a second aspect of the present invention there is provided software arranged to configure a data processing system having a plurality of sets of one or more data processing cores and supporting an operating system and a network interface device such that the operating system is arranged to support at least one socket operable to accept data received from the network, wherein the data belongs to one of a plurality of data flows and the socket is configured to provide an instance of at least some of the state associated with the data flows per said set of data processing cores.

According to a third aspect of the present invention there is provided a method for receiving data packets at a data processing system supporting a network interface device and having a plurality of sets of data processing cores, the method comprising the steps of: receiving at the network interface device a data packet belonging to one of a plurality of data flows; performing receive processing at a first processing core; selecting a socket supported by an operating system of the data processing system, the socket being configured to provide an instance of at least some of the state associated with the data flows per said set of processing cores; selecting the one of the plurality of instances of at least some of the state provided for the set of processing cores to which said first processing core belongs; and using the said instance of at least some of the state in the receive processing.

The method may further comprising the steps of: an application thread executing at a second processing core checking whether the listening socket has any new connections ready to be accepted; selecting for use in the operation only the instance of at least some of the state provided for the set of processing cores to which that second processing core belongs; and using the selected instance of state in the operation.

Suitably, the socket is a listening socket, the step of invoking an operation on the socket comprises checking whether the listening socket has any new connections ready to be accepted, and the step of using only the selected instance of state causes only those new connections represented by state held at that instance to be indicated to the application thread.

The first and second processing cores could be the same processing core.

DESCRIPTION OF THE DRAWINGS

The present invention will now be described by way of example with reference to the accompanying drawings, in which.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention has general application to multiprocessor data processing systems. The term "processor" as used herein may refer to a CPU having one or more processing cores, a single core of a multi-core processor, some or all cores of a multi-core processor, a logical processor, a dedicated packet processing unit, or any section of a processing unit or integrated circuit. A processor can be any entity configured to execute an instruction thread in the context of the state information for that thread. The term "processor" is used to indicate both physical and logical processors of a system.

The term "data flow" is to be understood in the context of whichever system the present invention is embodied. A data flow of a data processing system is generally identified by reference to an end point of the data processing system —for example, a socket, application or kernel entity. The data flows of a data processing system may be multiplexed together or aggregated in some way for transmission across a network.

The present invention finds application in data processing systems supporting one or more operating systems utilizing network sockets. A data processing system of the present invention may support a single monolithic operating system or multiple instances of virtual machines (VMs). In the latter case, a trusted software domain, such as a hypervisor, typically controls access by the VMs to the resources of the system. The term software domain is used herein to refer to both monolithic and virtualised operating system instances, and more generally to any software domain which supports network sockets.

Figure 2:
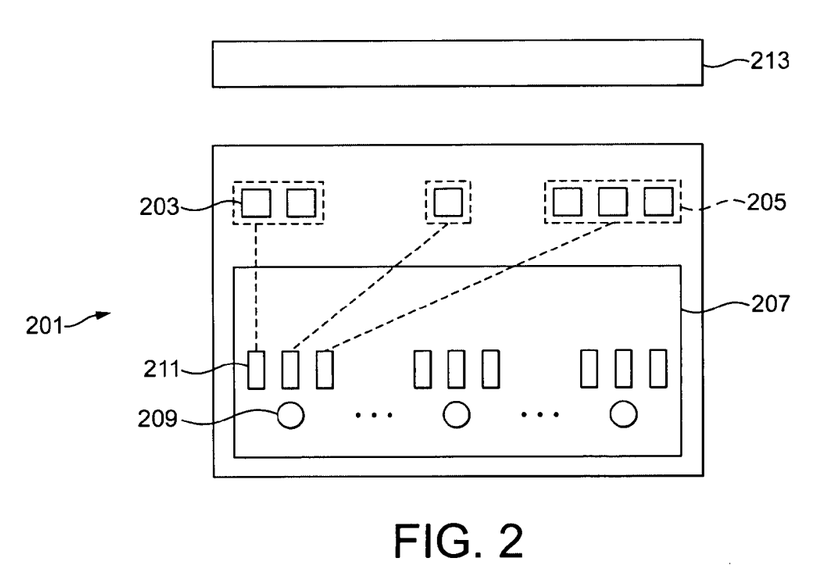
FIG. 2 shows a data processing system in accordance with the present invention.

FIG. 2 shows a data processing system 201 of the present invention supporting a network interface device 213. The system includes a plurality of sets 205 of one or more data processing cores 203 and an operating system 207 arranged to support at least one socket 209 operable to accept data received from the network, the data belonging to one of a plurality of data flows. Each socket is configured to provide an instance 211 of at least some of the state associated with the data flows per said set of data processing cores, as indicated in FIG. 2.

Typically, a data processing system operating in accordance with the present invention uses receive side scaling (RSS) to spread the load associated with receive processing across a set of the two or more processors of the system. The set of processors of the data processing system at which receive processing is performed in accordance with an RSS algorithm are termed the "RSS processors" of the system. The set of RSS processors comprises two or more processors of the system and may include all the processors of the system, or a subset.

The kernel or hypervisor (i.e. a trusted software domain) of the system may allocate a set of RSS processors to each software domain of the system. Each software domain of the system need not utilise the same number of RSS processors.

Each RSS processor supports an execution context for performing the protocol processing of received network packets. The execution context may be an interrupt handler or thread running in an operating system, or may be a thread which executes at the privilege level of user applications.

When a data flow is terminated at a software domain, there is typically an associated socket. State associated with each data flow is stored in a corresponding socket, and the socket also provides an interface by which applications may control flows and send and receive data. Connected sockets or stream sockets are usually each associated with a single data flow. Unconnected sockets or datagram sockets may be associated with multiple data flows. Connected and unconnected sockets may be used to transmit and receive data. A third category of sockets, listening sockets, provide a means to accept requests to establish new connections. Listening sockets maintain state relating to connection requests that are pending (referred to as the syn-recv queue) and those that are established and ready to be accepted (referred to as the accept queue).

Received packets associated with requests to establish new connections are delivered to the appropriate RSS processor according to an RSS algorithm. Thus the state associated with a listening socket is manipulated by each RSS processor, and consequently listening socket state is subject to bouncing between the caches of the RSS processors.

In order to accept a new connection, an application thread that is executing on a particular processor (which will be referred to as the "APP processor") typically retrieves new connections from the accept queue of a listening socket by invoking the accept( ) system call. This operation brings at least some state of the listening socket into the cache of the APP processor, causing further cache line bouncing.

In a first embodiment of the present invention, state associated with each listening socket is replicated for each RSS processor of the software domain. In particular, each listening socket is provided a syn-recv queue and preferably an accept queue for each RSS processor. When an initial connection request is received by a software domain it is directed to a particular RSS processor in accordance with the RSS algorithm. State associated with the new connection request is maintained in the syn-recv queue and accept queue associated with that same RSS processor.

In order to accept an incoming connection, an application thread that is executing on a particular APP processor invokes the accept( ) system call (or similar) so as to accept a new socket from the accept queue associated with that APP processor. A first effect of this arrangement is that each syn-recv queue and accept queue is accessed only by a single processor, so cache bouncing is avoided. A second effect of this arrangement is such that when an application thread accepts a new connection the APP processor and RSS processor are the same. If the application continues to manage the new connection on the same processor, then all operations associated with the data flow happen on the same processor and so cache bouncing and copy operations are minimised.

The operations invoked on a socket by an application bring the socket state into the cache of the APP processor, whereas the processing of packets received from the network brings socket state into the cache of the RSS-processor. A significant improvement in efficiency results from arranging the processor on which the relevant application thread executes (the APP processor) to be the same as the RSS processor at which the processing of received packets occurs. If the RSS and APP processors are different—which often happens in conventional multi-processor systems—state information must be moved into the RSS processor's cache when received packets are processed, and then copied into the APP processor's cache when the application invokes an operation on the socket.

In some arrangements not all of the processors in a software domain are configured to process received network data. In these cases there may be APP processors for which there is no corresponding RSS processor and accept queue. If an application thread operable according to the present invention invokes accept( ) while executing on an APP processor that is not an RSS processor, then most preferably an accept queue is chosen such that the accept queue's corresponding RSS processor is most "close" to the APP processor. A processor is close to another processor if they are hyper-threads on the same processing core, or cores within the same processor. Alternatively processors might be considered close if they share a cache, are on the same die, are connected to the same memory controller, or are members of the same non-uniform memory architecture (NUMA) node Processors (or processing cores) which are considered "close" may form a set that includes one RSS processor and any number of other processors at which application threads may execute. There may be multiple sets of processors defined at a data processing system. A socket configured in accordance with the present invention preferably provides an instance of state for each set of processing cores/processors.

As described herein, the instance of state includes the state related to data flows handled by the RSS processor of the set. Of course, any state instance could also include state which does not relate to a particular data flow (such as out-of-band state or state which is not connection-specific).

Applications can determine whether a listening socket has any new connections ready to be accepted by using one of a variety of I/O multiplexing mechanisms, including select( ) poll( ) epoll( ) GetQueuedCompletionStatus( ). These mechanisms provide a means to determine the readiness of many I/O streams (including listening sockets and connected/unconnected sockets) at once, and a means to block until at least one is ready. For clarity, only the poll( ) mechanism will be referred to herein, but the principles described extend to the other mechanisms.

It is advantageous to ensure consistency between I/O multiplexing mechanisms such as poll( ) and accept( ) calls which are invoked on the same processor. In embodiments of the present invention, when poll( ) is invoked for a listening socket the call only returns an indication that there are new connections ready to be accepted if those new connections are in the accept queue associated with the APP processor at which the poll( ) call is invoked. This ensures that a thread does not receive an indication that new connections are ready by way of a poll( ) call only to invoke accept( ) and discover that the new connections are on the accept queue associated with another processor.

Application threads may block waiting for new connections either by invoking a particular socket, or by way of an I/O multiplexing mechanism such as poll( ). It is advantageous that an application thread be woken from a blocked state only when a new connection is available in the accept queue of the APP processor at which the blocking operation was invoked. Alternatively a thread may be woken when a new connection is available in any of the accept queues, and the thread be arranged to run on an APP processor at which at least one new connection is available to be accepted.

Appendix A illustrates by way of simplified pseudo-code how a server operating in accordance with the present invention may use poll( ) to manage many I/O streams, with one or more threads or processes per RSS-processor.

In a second embodiment of the present invention, state associated with each unconnected socket is replicated for each RSS processor of the software domain. For example, each UDP socket is provided with a receive queue for each RSS processor. When a packet of a data flow is delivered to an unconnected socket, it is placed in the receive queue associated with the corresponding RSS processor of the data flow.

An application thread that invokes the recvfrom( ) system call (or similar) so as to receive data from the socket takes received data from the receive queue associated with the APP processor. Thus, each receive queue is accessed only by a single processor and cache bouncing is avoided.

When poll( ) is invoked for an unconnected socket, the call only returns an indication that there is new data ready to be received if the receive queue of the APP processor at which the poll( ) call is invoked is not empty.

When one or more threads are blocked waiting for received data on an unconnected socket, a thread is woken such that received data is available in the receive queue of the APP processor of the woken thread.

One or more of the processors of a system arranged to perform protocol processing of received data packets may be supported at a network interface device of the system. For example, the system may allow offloading of TCP processing to a NIC. Microsoft Chimney is one such example of a TCP offload architecture. However, there are other aspects of receive processing that may still be performed at a processor supported at the data processing system itself—for example, completing the I/O operation associated with the received data, and waking processes or threads that are waiting for the data. In a system configured to offload protocol processing to a NIC, these operations are preferably performed at an RSS processor and, in accordance with the present invention, new connections are accepted at the APP processor.

Identifying the data flow to which a received packet belongs identifies the receive channel into which the received packet should be written. Data packets received at the network interface device are mapped into the appropriate receive channel in dependence on the data flow to which the data packet belongs. Preferably this mapping is performed at the NIC. The data flow to which a packet belongs is indicated by the packet itself—typically in the packet header. For example, TCP-IP packets specify a data flow by means of a pair of host addresses and port numbers carried in the packet header.

The mapping of received data packets into the appropriate receive channels of the data processing system may be performed by any one of a filter, a table, a hash function (e.g. a Toeplitz function), or any other suitable technique known in the art.

Preferably it is the NIC which performs the mapping of received packets to their appropriate delivery channels. However, implementations are envisaged in which the mapping steps could be performed at a software domain of the data processing system. For example, a NIC could deliver all received packets to a device driver and the mapping operations could be performed at that device driver.

In a preferred implementation of the present invention, upon receiving a data packet at the NIC, a notification event is posted into the notification queue that corresponds to the data flow to which the packet belongs. The appropriate notification queue is therefore preferably selected in dependence on the mapping operation performed at the NIC on the basis of one or more characteristics of the received data packet.

The notification queues are preferably arranged such that each queue contains events relating to data flows handled by a particular RSS processor of the software domain, with hardware interrupts being delivered to that RSS processor. An event may indicate that one or more packets have been received, in which case the event handling routine causes those received packets to be processed at the appropriate RSS processor.

The principles of the present invention may be applied at any kind of data processor capable of processing incoming data packets, including personal computers, laptops, servers, bridges, switches, and routers. The data packets received at the NIC may be any kind of data packets. For example, the packets may be TCP/IP or UDP packets. The data processing system and NIC may support any set of protocols—for example, the data layer protocol in particular could be IEEE 802.11, Ethernet or ATM.

A network interface device as described herein could be an expansion card, a computer peripheral or a chip of any kind integrated into the data processing system—for example, the chip could be installed on the motherboard. The network interface device preferably supports a processor for performing, for example, packet mapping and physical layer receive/transmit processing. The network interface device may or may not be considered to form part of the data processing system.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

APPENDIX A

The following simplified pseudo-code illustrates how a server operating in accordance with the present invention may use poll( ) to manage many I/O streams, with one thread or process per RSS-CPU.

```
repeat_forever {
    n = poll(fds);
    for( i = 0; i < n; ++i )
        if( is_readable(fds[i]) ) {
            if( is_listening_socket(fds[i]) ) {
                accept_new_connection(fds[i]);
            else
                receive_and_process_data_from_stream(fds[i]);
        }
        else if( is_writable(fds[i]) ) {
            send_buffered_data_to_stream(fds[i]);
        }
        else if( is_error(fds[i]) ) {
            handle_error(fds[i]);
        }
}
```

The invention claimed is:

1. A data processing system supporting a network interface device for connection to a network, the data processing system comprising:
   a plurality of sets of one or more data processing cores configured to receive process data received from the network, via the network interface device; and
   an operating system arranged to support at least one socket configured to accept said receive processed data, the data belonging to one of a plurality of data flows;
   wherein at least one socket is configured to have a plurality of queues, each queue of the plurality of queues dedicated to a respective one of the sets of data processing cores, a particular one of the sets of data processing cores including a processing core which receive processed said data of said one of the data flows, wherein state associated with said one data flow is provided in one of the queues dedicated to the particular set of data processing cores; and
   wherein an application thread executing at a particular processing core of the data processing system invokes an operation on the socket using state provided in a queue for the set of processing cores that includes the particular processing core.

2. A data processing system as in claim 1, wherein the socket is a listening socket.

3. A data processing system as claimed in claim 1, wherein said queues comprise accept queues.

4. A data processing system as claimed in claim 1, wherein said queues comprise syn-rccv queues.

5. A data processing system as claimed in claim 1, wherein, on receiving one or more data packets of a data flow, the system is configured to select a particular data processing core of the data processing system to perform packet processing of the received data packets, the selected data processing core belonging to one of the sets of one or more data processing cores.

6. A data processing system as claimed in claim 5, wherein the selection is performed in accordance with a receive side scaling algorithm.

7. A data processing system as claimed in claim 5, wherein the selected processing core is selected in dependence on one or more characteristics of the received data packets.

8. A data processing system as claimed in claim 7, wherein the characteristic comprises a field of the data packet header.

9. A data processing system as claimed in claim 8, wherein the field of the data packet header contains a destination address or port number.

10. A data processing system as claimed in claim 1, wherein the operation is to accept a new connection.

11. A data processing system as claimed in claim 1, wherein, when the application thread invokes an operation on the socket relating to a particular data flow, the data processing system is configured to use in the operation state provided for the set of processing cores which includes the data processing core selected to perform processing of data belonging to that data flow.

12. A data processing system as claimed in claim 1, wherein the operation invoked on the socket is an operation arranged to: cause a new connection to be accepted, receive data, transmit data, or to query a status of the socket.

13. A data processing system as claimed in claim 1, further comprising a plurality of packet processing entities, each arranged to execute at a particular one of the processing cores allocated for performing packet processing and each maintaining at least some of the state of the socket.

14. A data processing system as claimed in claim 1, wherein each set of processing cores comprises processing cores that share a cache and/or a die.

15. A data processing system as claimed in claim 14, wherein the cores in each set of processing cores are members of the same non-uniform memory architecture node.

16. A data processing system as claimed in claim 1, wherein the operating system is arranged to support a plurality of sockets and each socket is configured to provide an instance of at least some of the state associated with the data flows of the respective socket per said set of processing cores.

17. A method for receiving data packets at a data processing system supporting a network interface device and having a plurality of sets of data processing cores, the method comprising the steps of:
   receiving at the network interface device a data packet belonging to one of a plurality of data flows;
   performing receive processing at a first data processing core of the plurality of sets of data processing cores;
   selecting a socket supported by an operating system of the data processing system, the socket having a plurality of queues and configured to accept said receive processing data, each queue of the plurality of queues dedicated to a respective one of the sets of data processing cores, a particular one of the sets of data processing cores including the first data processing core which receive processed said data packet, state associated with said data packet being provided in a respective queue dedicated to the particular set of data processing core; and
   wherein an application thread executing at a particular processing core of the data processing system invokes an operation on the socket using state provided in a queue for the set of processing cores that includes the particular processing core.

18. A method according to claim 17, wherein the socket is a listening socket.

19. A method as claimed in claim 18, further comprising the steps of:
- an application thread executing at a second processing core checking whether the listening socket has any new connections ready to be accepted;
- selecting for use in the operation only the state provided for the set of processing cores to which that second processing core belongs; and
- using the selected state in the operation.

20. A method as claimed in claim 19, wherein the step of invoking an operation on the socket comprises checking whether the listening socket has any new connections ready to be accepted, and the step of using the selected state causes only those new connections represented by state in the queue associated with the second processing core to be indicated to the application thread.

21. A method as claimed in claim 19, wherein the first and second processing cores are the same processing core.

* * * * *